United States Patent [19]

Brandstatter

[11] Patent Number: 4,665,475

[45] Date of Patent: May 12, 1987

[54] CURRENT CONVERTER

[75] Inventor: Wolfgand Brandstatter, Vienna, Austria

[73] Assignee: Schrack Elektronik - Aktiengesellschaft, Vienna, Austria

[21] Appl. No.: 783,991

[22] Filed: Oct. 4, 1985

[30] Foreign Application Priority Data

Oct. 5, 1984 [AT] Austria .................................. 3172/84

[51] Int. Cl.$^4$ ........................................... H02H 7/122
[52] U.S. Cl. ....................................... 363/56; 363/26; 363/97
[58] Field of Search ..................................... 363/18-26, 363/56, 95, 97, 131, 133-134, 86, 89; 323/266

[56] References Cited

U.S. PATENT DOCUMENTS

| 4,063,306 | 12/1977 | Perkins et al. ........................ 363/56 X |
| 4,260,943 | 4/1981 | Zaderej et al. ........................ 363/18 X |
| 4,307,353 | 12/1981 | Nilssen ............................ 323/289 X |
| 4,336,587 | 6/1982 | Boettcher, Jr. et al. ......... 363/56 X |
| 4,356,416 | 10/1982 | Weischeldel .................... 363/134 X |
| 4,370,701 | 1/1983 | Western ........................... 363/56 X |
| 4,378,586 | 3/1983 | Bete ...................................... 363/56 |

FOREIGN PATENT DOCUMENTS

| 0148681 | 9/1983 | Japan ................................... 363/133 |
| 0165675 | 9/1983 | Japan ................................... 363/133 |
| 0964929 | 10/1982 | U.S.S.R. .............................. 363/133 |

Primary Examiner—Peter S. Wong
Attorney, Agent, or Firm—Cushman, Darby & Cushman

[57] ABSTRACT

Current converter comprising a rectifier circuit and a converter transformer at the primary side of which a damping network is arranged, the damping network comprising a blocking oscillator circuit.

11 Claims, 2 Drawing Figures

CURRENT CONVERTER

BACKGROUND OF THE INVENTION

This invention relates to an alternating-current-/direct-current converter, hereinafter briefly called current converter comprising a rectifier circuit, a converter transformer at ther primary side of which a damping network is arranged and control means for monitoring the input voltage.

Known converter configurations use damping networks to damp switching transient which occurs at the converter transformer and eliminate switching losses. As a rule, such damping networks have been formed by a series circuit of a diode and a capacitor, in which arrangement the capacitor is bridged by a resistor used for eliminating the energy loss of the converter transformer.

This known solution has the disadvantage that, although overvoltages are avoided, the energy loss occurring is not recovered. Also, a separate power supply is required for supplying power to auxiliary circuits such as, for example, the control circuit of the converter transformer in the known solution. Another disadvantage of known converters is that the input voltage is not directly monitored by the converter circuit.

SUMMARY OF THE INVENTION

The present invention has the objective of avoiding these disadvantages. The invention proposes a converter of the type initially mentioned, which makes it possible to utilise the switching losses and control the input voltage.

This is achieved by employing feedback means and a control means in the converter circuit. Arranging the feedback means in the circuit makes it possible to utilize the energy which is lost in previous converter devices.

In the preferred embodiment of the invention, provision is made for the secondary winding of the transformer of the blocking oscillator circuit to be fed back to the primary side of the converter transformer via a rectifier. The power loss is largely recovered in this manner. The control means of applicant's converter circuit utilizes the switching overvoltages to determine whether the input voltage to the converter transformer is of a proper level. In the preferred embodiment of the invention, a blocking oscillator circuit with an additional secondary winding followed by a rectifier supplies the switching overvoltages, to the input of a comparator for monitoring the input voltage. As a result of these measures, it is very simple for the converter to be switched off, for example if the input voltage drops to values at which reliable operation of the converter is no longer ensured.

In the preferred embodiment is so because the output voltage of the additional secondary winding of the blocking oscillator has a fixed relationship to the voltage present at the secondary winding of the blocking oscillator which is fed back to the input of the current converter.

So that the converter transformer is accurately switched off with too small an input voltage with little circuit expenditure and extensive suppression of transient events, the control means output is connected to the drive circuit of the converter transformer.

Furthermore, connecting the control means to the output voltage regulator of the converter transformer provides a disturbance variable feed forward which improves the dynamic characteristics of the regulating loop. Thus, for example, better control of hum voltages present at the input is achieved by this means.

Provision is also made to supply voltage terminals of auxiliary circuits with voltage derived from the switching overvoltages, for example the preferred embodiment, the regulator, the pulse width modulator and the comparator can be connected to the output of the rectifier arranged at the additional secondary winding of the transformer of the blocking oscillator circuit to supply these circuits with voltage.

BRIEF DESCRIPTION OF THE DRAWINGS

The invention as discussed in the detailed description of the preferred embodiment will be more fully understood with the aid of the drawing in which.

DETAILED DESCRIPTION OF THE PREFERRED EMBODIMENT

Figure 1:
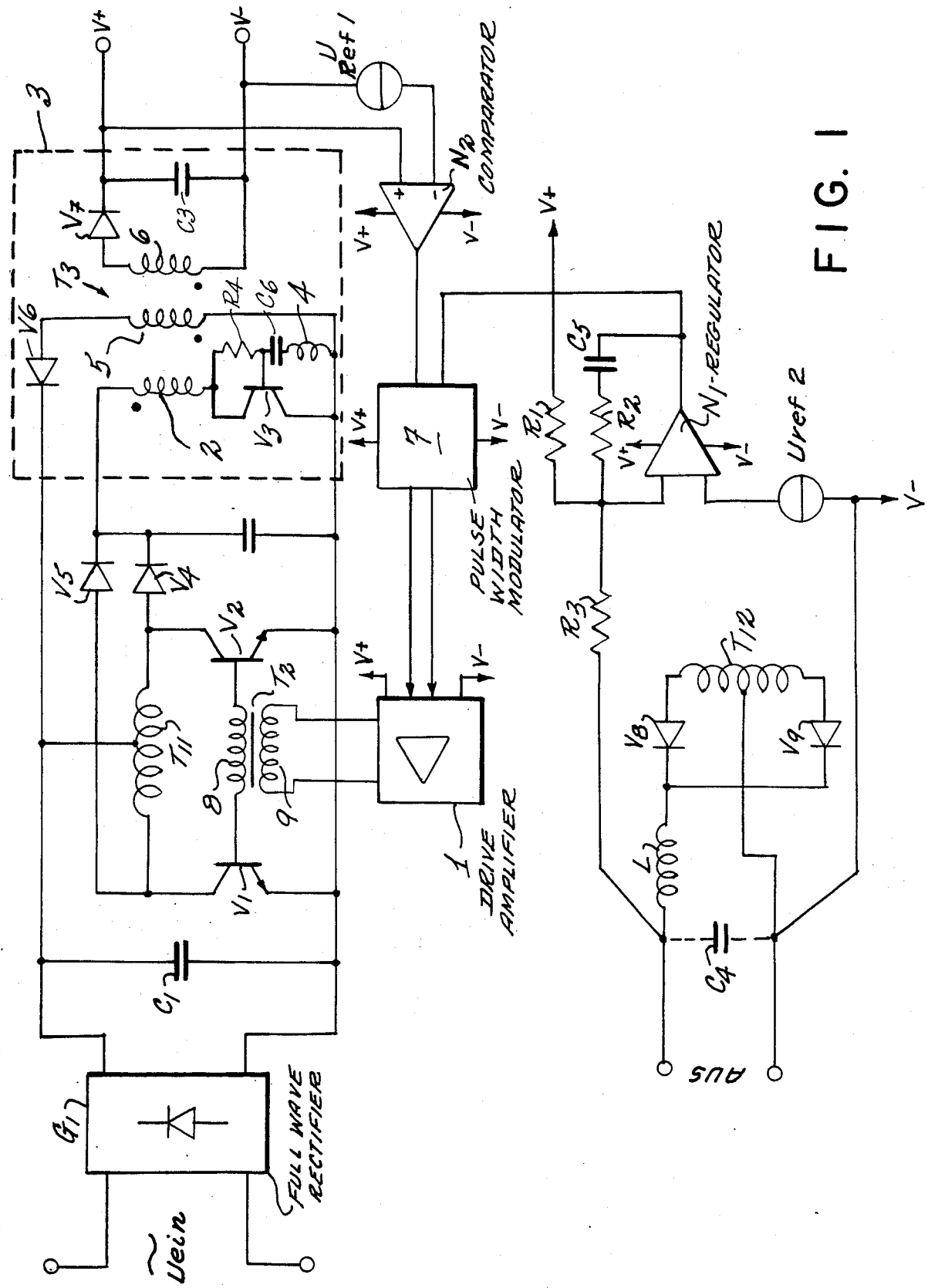
FIG. 1 shows a circuit diagram of an current converter according to the invention.

According to FIG. 1, the input alternating voltage $U_{ein}$ is applied to a rectifier circuit G1 which can be, for example, a bridge rectifier circuit. The output of this rectifier circuit is connected to a converter transformer. As can be seen from FIG. 1, the primary winding T11 of the converter transformer is provided with a center tap, the primary winding T11 being connected to the output direct voltage of the rectifier circuit G1 via the centre tap and via the two transistors V1, V2 the bases of which are connected to the secondary winding 8 of a drive transformer T2 the primary winding 9 of which is connected to a drive amplifier 1. For compensating or damping the voltage peaks occurring as a result of switching processes, a capacitor C1 is connected in parallel with the input terminals. The primary winding T11 of the converter transformer is inductively coupled to the secondary winding T12 which supplies the output voltage via the diodes V8, V9 and a smoothing section L, C4.

The two ends of the primary winding T11 of the converter transformer are connected via two diodes V4, V5, which are connected in the same direction, to an electrode of a storage capacitor C2 to which electrode the start of the primary winding 2 of the transformer T3 of the blocking oscillator circuit 3 is also connected. The second electrode of the storage capacitor C2 is directly connected to an input terminal whereas the primary winding 2 of the transformer T3 is connected via a transistor V3, the base of which is connected to a control winding 4 of the transformer T3, to an input terminal to which the control winding 4 and a first secondary winding 5 of the transformer T3 are also connected, which latter winding is wound in the opposite direction to the winding direction of the primary winding 2 and is connected via a diode V6 to the second input terminal.

The blocking oscillator circuit 3 is also provided with another secondary winding 6 of the transformer T3 which supplies via the diode V7 and the smoothing capacitor C3 a voltage for supplying auxiliary circuits for controlling the converter transformer, in which arrangement the two secondary winding 5 and 6 are wound in the same direction.

The secondary winding 6 and the diode V7 are connected to the supply voltage terminals V+, V− of a regulator N1, a comparator N2, a pulse width modulator 7 and the drive amplifier 1. The regulator N1 and a reference voltage source U ref 2 and the pulse width modulator 7 can be jointly implemented by the Motorola chip TL 494. The comparator N2 can be the Motorola chip LM 393. In addition, the diode V7 is also connected to one input of the comparator N2 the second input of which is connected to a reference voltage source U ref 1, connected to V—, and the output of which is connected to an input of the pulse width modulator 7. The output of this modulator is connected to the control inputs of the drive amplifier 1.

The output V+ of the blocking oscillator 3 is connected via a resistor R1 to the control input of the regulator N1, which control input is connected via the resistor R3 to an output terminal and the feedback loop which consists of the resistor R2 and the capacitor C5 and which is connected to the output of the regulator N1. The second input of the regulator N1 is connected to a reference voltage source U ref 2 which determines the nominal value of the output voltage and which, in turn, is connected to the output V— of the blocking oscillator 3 and an output terminal of the AC/DC converter.

When an input voltage is applied, the transistors V1, V2 are alternately switched on which causes the input voltage alternately to be applied to the winding halves of the primary winding T11 of the converter transformer. Due to the inductive coupling between the primary winding T11 and the secondary winding T12, a voltage is produced across the latter, the amplitude of which voltage is determined by the turns ratio of the two windings and by the input voltage.

Due to the inductive losses of the converter transformer, switching overvoltages would occur during the switching processes if no special precautions are taken. These energies are supplied to the storage capacitor C2 by the two diodes V4 and V5. At the start of oscillation, that is to say at the first cycle when starting up, the charge present at the capacitor C2 will also be present at the base of the transistor V3 via the primary winding 2 of the blocking oscillator 3 and the resistor R4. If this potential reaches a value which is sufficient for switching on the transistor V3, the transistor V3 will conduct and the capacitor C2 will quickly discharge via the primary winding 2 and the collector-emitter path of the transistor V3. During this process, the capacitor C6 will prevent the charge at the base of the transistor V3, which is responsible for switching it on, form draining away. As a result of the charging current flowing through the winding 2, a voltage is induced in the winding 4 which causes the transistor V3 to be switched on as a result of which the capacitor C2 rapidly loses its charge to the primary winding 2. As soon as the primary winding 2 is saturated, no further voltage occurs across the control winding 4. The transistor V3 begins to cut off which causes the polarity of the voltage present at the blocking oscillator 3 to be reversed, the transistor V3 cuts off completely and the magnetic energy stored in the blocking oscillator 3 is removed via the secondary windings 5 and 6. The energy of the secondary winding 5 is fed back to the input via the diode V6 and the energy of the secondary winding 6 is fed as supply voltage to the components N1, N2, 7 and 1 via the rectifier circuit formed of the diode V7 and the capacitor C3.

As a result of this removal of wasted energy, the switching voltage peaks occurring can be reduced.

Since the kick-back voltage of the blocking oscillator circuit 3 is clamped by the input voltage of the converter transformer, a voltage proportional to the input voltage or corresponding to the turns ratio of the transformer T3 is produced across the smoothing capacitor C3. The voltage supply to the non-inverting input of the comparator N2 thus corresponds to the input voltage.

The comparator N2 compares the voltage at the capacitor C3 with a reference voltage U ref 1 which is preset, for example, to correspond to the smallest input voltage required for reliable operation of the current converter. This reference voltage U ref 1 is supplied by a reference voltage source such as, for example, a Zener diode circuit. If the input voltage drops below this value, the comparator N2 supplies a blocking signal to the pulse width modulator 7 so that the latter inhibits any further emission of pulses, which causes the AC/DC converter to be switched off and to cease operating. The pulse width of the pulses emitted by the pulse width modulator is a function of the signal supplied by the regulator N1. One input of this regulator N1 is connected via the resistor R3 to an output terminal and the regulator compares the output voltage with the reference voltage U ref 2, applied to its second input, which is supplied by a reference voltage source U ref 2 connected to the second output terminal. Depending on the magnitude of the output voltage in comparison with the reference voltage, the regulator supplies a particular signal which determines the pulse width. With constant pulse intervals, shorter pulses result in a higher output voltage. The pulses supplied by the pulse width modulator 7 are amplified in the drive amplifier 1 and produce a current flow in alternating directions in the primary winding 9 of the transformer T2 as a result of which the polarity also changes at the outputs of the secondary winding 8 and the transistors V1, V2 are alternately turned on. The drive amplifier 1 can also be omitted if the output pulses of the pulse width modulator 7 are sufficient for driving the transformer T2.

Figure 2:
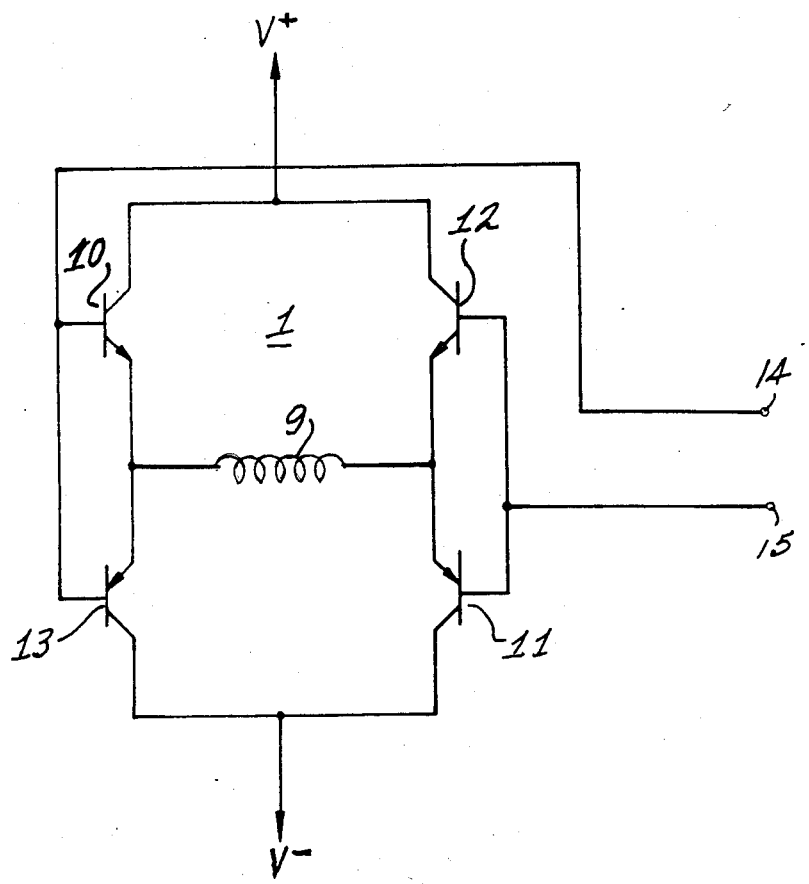
FIG. 2 shows the circuit diagram of a drive amplifier.

As can be seen from FIG. 2, the drive amplifier 1 can be formed by a bridge circuit of four transistors 10 to 13, of which those diagonally opposite to each other have the same configuration but those adjacent to each other have different configurations. In this arrangement, the bases of two transistors 10, 13 and 12, 11 each located in one branch of the bridge are connected to each other. Depending on which of the two control inputs 14, 15 is supplied with a positive pulse, the current flows in one direction via the transistor 10 and 11 or in the other direction via the transistors 12 and 13 through the secondary winding 9 of the transformer T2, the secondary winding 9 being connected to the centre terminal of the two bridge branches.

I claim:
1. A current converter comprising:
   a converter transformer having a primary winding;
   means for alternately causing current to flow in opposite directions through said primary winding of said converter transformer;
   means for storing energy associated with overvoltages produced by operation of said causing means;
   first inductive means for inductively coupling energy stored in said storing means back to said primary winding of said converter transformer;
   second inductive means for inductively producing a voltage from energy stored in said storing means, said first inductive means including means for causing said voltage produced by said second inductive means to be related to a voltage associated with said primary winding of said converter transformer; and means for controlling said causing means in relation to said voltage produced by said second inductive means.

2. A converter as in claim 1 wherein said controlling means includes means for stopping said causing means from operating when said voltage of said second inductive means drops below a predetermined value.

3. A converter as in claim 2 wherein said causing means includes a pulse width modulator which is selectively inhibited by said controlling means.

4. A converter as in claim 1 wherein said controlling means includes a voltage regulator, responsive to an output of said converter transformer and said voltage of said second inductive means for controlling said causing means to cause said output of said converter transformer to achieve a predetermined value.

5. A converter as in claim 1 wherein said storing means includes a capacitor and diodes connecting opposite ends of said primary winding of said converter transformer to said capacitor to charge said capacitor.

6. A converter as in claim 1 wherein said voltage causing means of said first inductive means includes a diode connected between said first inductive means and said primary of said converter transformer.

7. A converter as in claim 1 wherein:
said converter further comprises a primary coil and means for successively causing energy from said storing means to flow through said primary coil;
said first inductive means includes a first secondary coil inductively coupled to said primary coil and a diode connecting said first secondary coil to said primary winding of said converter transformer; and
said second inductive means includes a second secondary winding inductively coupled to said primary winding.

8. A current converter comprising:
a converter transformer having center tapped primary winding;
input means for applying a direct voltage to said center tap of said converter transformer primary winding;
two controllable switching devices attached to each end of said primary winding, each device having a control electrode and current conducting electrodes, one of said current conducting electrodes from each of said devices being connected together and connected to said input means;
a plurality of rectifier diodes, one electrode of each of said diodes being connected to opposite ends of said converter transformer primary winding, another electrode of each of said diodes being connected together;
a first capacitor connected to said plurality of rectifier diodes;
a single alternating voltage source having opposite ends connected directly to said control electrodes;
a blocking oscillator circuit, said blocking oscillator including a transformer having a primary winding attached to said rectifier diodes, a control winding, a secondary winding and another secondary winding, a switch having one current conducting terminal connected to said primary winding, another current conducting terminal and a control terminal, a resistor connected between said one current conducting terminal and said control terminal, a second capacitor connected with said control winding in series between said control terminal and said another current carrying terminal of said switch, a rectifier diode connected between said secondary winding of said transformer and said center tap of said converter transformer primary winding, another rectifier diode connected in series with said additional secondary winding and a third capacitor connected in parallel with said additional secondary winding and another said rectifier diode;
comparator means for comparing a voltage across said third capacitor with a reference voltage, said comparator means; and
control means for applying an output of said comparator means to change a signal of said single alternating voltage source supplied to said control electrodes of said switching devices.

9. A converter according to claim 8 wherein said control means includes a pulse width modulator.

10. A converter according to claim 8 wherein the voltage produced across said third capacitor is also used to supply voltage to said alternating voltage source and said comparator means.

11. A converter according to claim 8 further comprising regulator means for controlling said control means in response to a voltage on said secondary winding of said converter transformer and said voltage across said third capacitor.

* * * * *